US012663679B2

(12) United States Patent
Liu et al.

(10) Patent No.: US 12,663,679 B2
(45) Date of Patent: Jun. 23, 2026

(54) ARRAY SUBSTRATE AND TOTAL REFLECTION LIQUID CRYSTAL DISPLAY PANEL

(71) Applicant: TCL CHINA STAR OPTOELECTRONICS TECHNOLOGY CO., LTD., Shenzhen (CN)

(72) Inventors: Wuguang Liu, Shenzhen (CN); Yingchun Zhao, Shenzhen (CN); Yinuo Liu, Shenzhen (CN); Ying Lu, Shenzhen (CN); Jianbo Gao, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 141 days.

(21) Appl. No.: 17/758,019

(22) PCT Filed: May 13, 2022

(86) PCT No.: PCT/CN2022/092679
§ 371 (c)(1),
(2) Date: Jun. 26, 2022

(87) PCT Pub. No.: WO2023/206620
PCT Pub. Date: Nov. 2, 2023

(65) Prior Publication Data
US 2024/0168343 A1      May 23, 2024

(30) Foreign Application Priority Data

Apr. 26, 2022      (CN) .......................... 202210450791.2

(51) Int. Cl.
*G02F 1/1343* (2006.01)
*G02F 1/1333* (2006.01)

(52) U.S. Cl.
CPC .... *G02F 1/13439* (2013.01); *G02F 1/133357* (2021.01); *G02F 2203/02* (2013.01)

(58) Field of Classification Search
CPC ................................................. G02F 1/133553
See application file for complete search history.

(56) References Cited

U.S. PATENT DOCUMENTS 4,431,272 A * 2/1984 Yazawa ................. G02F 1/1362
349/113
4,519,678 A 5/1985 Komatsubara
(Continued)

FOREIGN PATENT DOCUMENTS

| CN | 1246631 A | 3/2000 |
| CN | 1477433 A | 2/2004 |

(Continued)

OTHER PUBLICATIONS

International Search Report in International application No. PCT/CN2022/092679, mailed on Nov. 28, 2022.
(Continued)

*Primary Examiner* — Alexander P Gross
(74) *Attorney, Agent, or Firm* — PV IP PC; Christopher S. Ruprecht; Wei Te Chung

(57) ABSTRACT

An array substrate and a total reflection liquid crystal display panel are provided. By disposing an uneven surface which is at least partially uneven on a side of a planarization layer away from a substrate in the total reflection liquid crystal display panel, a reflection electrode can be disposed along the uneven surface of the planarization layer in an uneven shape, thereby changing an reflective direction of a light in the panel. Therefore, the light that cannot be reflected at a
(Continued)

critical angle of total reflection originally is allowed to be reflected out of the panel, thereby increasing reflectivity of the total reflection liquid crystal display panel.

15 Claims, 5 Drawing Sheets

(56)                References Cited

U.S. PATENT DOCUMENTS

| | | | |
|---|---|---|---|
| 6,219,119 | B1 | 4/2001 | Nakai |
| 6,414,735 | B1 | 7/2002 | Kim |
| 2003/0007113 | A1* | 1/2003 | Yamanaka ............... G02B 5/08 |
| | | | 349/113 |
| 2004/0125288 | A1 | 7/2004 | Jeong et al. |
| 2004/0196421 | A1* | 10/2004 | Hwang ............... G02F 1/13394 |
| | | | 349/114 |
| 2007/0139591 | A1* | 6/2007 | Kim .................. G02F 1/133555 |
| | | | 349/114 |
| 2008/0123034 | A1 | 5/2008 | Cho |
| 2010/0006842 | A1 | 1/2010 | Fujita |
| 2012/0281171 | A1 | 11/2012 | Takashima |
| 2014/0048835 | A1* | 2/2014 | Cain ..................... H01L 33/405 |
| | | | 257/98 |
| 2017/0186784 | A1* | 6/2017 | Yang .................. H10D 30/0321 |
| 2019/0227358 | A1* | 7/2019 | Qin .................... G02F 1/133553 |

FOREIGN PATENT DOCUMENTS

| | | | |
|---|---|---|---|
| CN | 1514276 | A | 7/2004 |
| CN | 102667587 | A | 9/2012 |
| CN | 205787482 | U | 12/2016 |
| CN | 107102470 | A | 8/2017 |
| CN | 109524422 | A | 3/2019 |
| CN | 109976048 | A | 7/2019 |
| CN | 111474777 | A | 7/2020 |
| CN | 111796452 | A | 10/2020 |
| CN | 111929944 | A | 11/2020 |
| JP | H11109392 | A | 4/1999 |
| JP | 2001281650 | A | 10/2001 |
| JP | 2002014337 | A | 1/2002 |
| JP | 2002296585 | A | 10/2002 |
| JP | 2005128084 | A | 5/2005 |
| JP | 2005300564 | A | 10/2005 |
| JP | 2005316399 | A | 11/2005 |
| JP | 2006189546 | A | 7/2006 |
| JP | 2006330471 | A | 12/2006 |
| JP | 2008287286 | A | 11/2008 |
| KR | 20130071452 | A | 6/2013 |
| KR | 20200115790 | A | 10/2020 |
| WO | 2009001508 | A1 | 12/2008 |
| WO | 2011070866 | A1 | 6/2011 |

OTHER PUBLICATIONS

Written Opinion of the International Search Authority in International application No. PCT/CN2022/092679,mailed on Nov. 28, 2022.

Chinese Office Action issued in corresponding Chinese Patent Application No. 202210450791.2 dated May 13, 2023, pp. 1-8.

Chinese Office Action issued in corresponding Chinese Patent Application No. 202210450791.2 dated Nov. 5, 2024, pp. 1-8.

Korean Office Action issued in corresponding Korean Patent Application No. 10-2022-7023802 dated Apr. 10, 2024, pp. 1-8.

Japanese Office Action issued in corresponding Japanese Patent Application No. 特願 2022-530141 dated Jun. 18, 2024, pp. 1-5.

European Office Action issued in corresponding European Patent Application No. 22731975.3 dated Feb. 27, 2026, pp. 1-15.

Indian Office Action issued in corresponding Indian Patent Application No. 202217037297 dated Apr. 20, 2026, pp. 1-7.

* cited by examiner

ARRAY SUBSTRATE AND TOTAL REFLECTION LIQUID CRYSTAL DISPLAY PANEL

BACKGROUND OF INVENTION

Field of Invention

The present invention relates to the field of display technology, and particularly to an array substrate and a total reflection liquid crystal display panel.

Description of Prior Art

For a long time, transmissive liquid crystal display technology has occupied the main position of liquid crystal display (LCD) panels. With increasing market requirements of outdoor displays with low power consumption, market prospect of reflective liquid crystal displays has gradually emerged.

Compared to transmissive liquid crystal display panels, reflective liquid crystal display panels can clearly display in a scene under an ambient light source, do not need backlights, have advantages of thin and light bodies and low power consumption, and have good market application prospect in the field of outdoor display.

Currently, a common problem faced by reflective LCD television panels is low reflectivity. At present, reflectivity of largest mass production level can be achieved by industries is within 10%. A main reason is that light paths of the reflective liquid crystal display panels are reflected through a plurality of paths, resulting in serious energy loss, which eventually leads to output light only reaching 10% of incident light. Therefore, how to improve the reflectivity is an important problem faced by current emissive liquid crystal display technology.

In summary, current reflective liquid crystal display panels have the problem of low reflectivity. Therefore, an array substrate and a total reflection liquid crystal display panel need to be provided to solve the defect.

SUMMARY OF INVENTION

Embodiments of the present application provide an array substrate and a total reflection liquid crystal display panel, which can increase reflectivity of the total reflection liquid crystal display panel.

One embodiment of the present application provides an array substrate, including:

a substrate;

a driving circuit layer disposed on the substrate;

a planarization layer disposed on a side of the driving circuit layer away from the substrate, wherein a side of the planarization layer away from the substrate has an uneven surface which is at least partially uneven; and a reflection electrode layer disposed on the side of the planarization layer away from the substrate and disposed along the uneven surface of the planarization layer in an uneven shape.

According to one embodiment of the present application, the planarization layer has a plurality of convex structures or concave structures, and the plurality of convex structures or the plurality of concave structures are distributed in an array manner on the side of the planarization layer away from the substrate.

According to one embodiment of the present application, the plurality of convex structures have a curved surface that is convex, and an included angle between a tangent of any point on the curved surface and a flat surface of the planarization layer is less than or equal to 10°.

According to one embodiment of the present application, the plurality of concave structures have a curved surface that is concave, and an included angle between a tangent of any point on the curved surface and a flat surface of the planarization layer is less than or equal to 10°.

According to one embodiment of the present application, the plurality of convex structures or the plurality of concave structures are distributed continuously or spaced apart on a surface of the side of the planarization layer away from the substrate.

According to one embodiment of the present application, the plurality of convex structures are spaced apart and arranged in rows along a first direction, the plurality of convex structures are spaced apart and arranged in columns along a second direction, and the first direction is different from the second direction; and wherein any two adjacent rows or any two adjacent columns of the plurality of convex structures are disposed side by side, or any two adjacent rows or any two adjacent columns of the plurality of convex structures are disposed in a stagger manner.

According to one embodiment of the present application, the plurality of concave structures are spaced apart and arranged in rows along a first direction, the plurality of concave structures are spaced apart and arranged in columns along a second direction, and the first direction is different from the second direction; and wherein any two adjacent rows or any two adjacent columns of the plurality of concave structures are disposed side by side, or any two adjacent rows or any two adjacent columns of the plurality of concave structures are disposed in a stagger manner.

According to one embodiment of the present application, a shape of the plurality of convex structures or the plurality of concave structures is any one of a triangle, a quadrilateral, a pentagon, a hexagon, a circle, or an ellipse.

According to one embodiment of the present application, the reflection electrode layer includes a first electrode layer, a material of the first electrode layer is a metal or an alloy.

According to one embodiment of the present application, a material of the first electrode layer includes any one of or an alloy of a plurality of gold, silver, copper, or aluminum.

According to one embodiment of the present application, the reflection electrode layer includes a second electrode layer and a third electrode layer, the first electrode layer is disposed between the second electrode layer and the third electrode layer, and a material of the second electrode layer and the third electrode layer is a transparent conductive metal oxide.

According to the array substrate provided by the aforesaid embodiments, one embodiment of the present application provides a total reflection liquid crystal display panel, including the array substrate, a color filter substrate, and a liquid crystal layer disposed between the array substrate and the color filter substrate. The array substrate includes:

a substrate;

a driving circuit layer disposed on the substrate;

a planarization layer disposed on a side of the driving circuit layer away from the substrate, wherein a side of the planarization layer away from the substrate has an uneven surface which is at least partially uneven; and a reflection electrode layer disposed on the side of the planarization layer away from the substrate and disposed along the uneven surface of the planarization layer in an uneven shape.

According to one embodiment of the present application, the planarization layer has a plurality of convex structures or concave structures, and the plurality of convex structures or the plurality of concave structures are distributed in an array manner on the side of the planarization layer away from the substrate.

According to one embodiment of the present application, the plurality of convex structures have a curved surface that is convex, and an included angle between a tangent of any point on the curved surface and a flat surface of the planarization layer is less than or equal to 10°.

According to one embodiment of the present application, the plurality of concave structures have a curved surface that is concave, and an included angle between a tangent of any point on the curved surface and a flat surface of the planarization layer is less than or equal to 10°.

According to one embodiment of the present application, the plurality of convex structures or the plurality of concave structures are distributed continuously or spaced apart on a surface of the side of the planarization layer away from the substrate.

According to one embodiment of the present application, the plurality of convex structures are spaced apart and arranged in rows along a first direction, the plurality of convex structures are spaced apart and arranged in columns along a second direction, and the first direction is different from the second direction; and wherein any two adjacent rows or any two adjacent columns of the plurality of convex structures are disposed side by side, or any two adjacent rows or any two adjacent columns of the plurality of convex structures are disposed in a stagger manner.

According to one embodiment of the present application, the plurality of concave structures are spaced apart and arranged in rows along a first direction, the plurality of concave structures are spaced apart and arranged in columns along a second direction, and the first direction is different from the second direction; and wherein any two adjacent rows or any two adjacent columns of the plurality of concave structures are disposed side by side, or any two adjacent rows or any two adjacent columns of the plurality of concave structures are disposed in a stagger manner.

According to one embodiment of the present application, a shape of the plurality of convex structures or the plurality of concave structures is any one of a triangle, a quadrilateral, a pentagon, a hexagon, a circle, or an ellipse.

According to one embodiment of the present application, the reflection electrode layer includes a first electrode layer, and a material of the first electrode layer is a metal or an alloy.

According to one embodiment of the present application, a material of the first electrode layer includes any one of or an alloy of a plurality of gold, silver, copper, or aluminum.

According to one embodiment of the present application, the reflection electrode layer includes a second electrode layer and a third electrode layer, the first electrode layer is disposed between the second electrode layer and the third electrode layer, and a material of the second electrode layer and the third electrode layer is a transparent conductive metal oxide.

Beneficial effects of embodiments of the present disclosure: the embodiments of the present application provide the array substrate and the total reflection liquid crystal display panel; the total reflection liquid crystal display panel includes the array substrate, the color filter substrate, and the liquid crystal layer; the array substrate includes the substrate, the driving circuit layer, the planarization layer, and the reflection electrode layer; by disposing the at least partially uneven surface on the side of the planarization layer away from the substrate, the reflection electrode can be disposed along the uneven surface of the planarization layer in the uneven shape, thereby changing an reflective direction of a light in the panel; therefore, the light that cannot be reflected at a critical angle of total reflection originally is allowed to be reflected out of the panel, thereby increasing the reflectivity of the total reflection liquid crystal display panel.

DESCRIPTION OF DRAWINGS

To more clearly illustrate the technical solutions of the embodiments or prior art, the accompanying figures required for illustrating embodiments or the prior art will be described in brief. Obviously, the accompanying figures described below are only part of the disclosed embodiments, from which those skilled in the art can derive further figures according to these accompanying figures without making any inventive efforts.

DETAILED DESCRIPTION OF EMBODIMENTS

Figure 1:
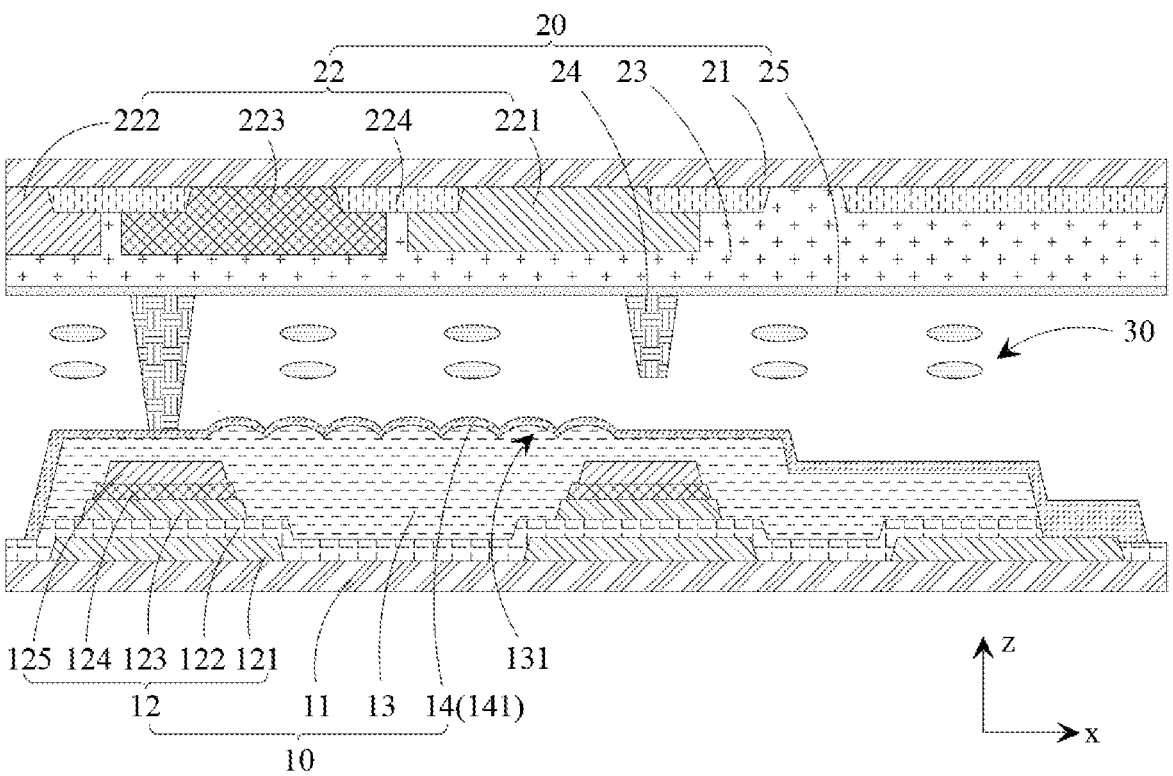
FIG. 1 is a structural schematic diagram of a total reflection liquid crystal display panel provided by one embodiment of the present application.

The descriptions of embodiments below refer to accompanying drawings in order to illustrate certain embodiments which the present disclosure can implement. The directional terms of which the present disclosure mentions, for example, "top", "bottom", "upper", "lower", "front", "rear", "left", "right", "inside", "outside", "side", etc., are only refer to directions of the accompanying figures. Therefore, the adopted directional terms are used to describe and understand the present disclosure, but the present disclosure is not limited thereto. In the figures, units with similar structures are indicated by the same reference numerals.

The present disclosure will be further described in detail below in combination with the drawings and specific embodiments.

Illustrated in FIG. 1 is a structural schematic diagram of a total reflection liquid crystal display panel provided by one embodiment of the present application. The display panel includes an array substrate 10 and a color filter substrate 20 disposed opposite to each other, and a liquid crystal layer 30 disposed between the array substrate 10 and the color filter substrate 20.

The array substrate 10 includes a substrate 11, a driving circuit layer 12, a planarization layer 13, and a reflection electrode layer 14. The substrate 11 is a glass substrate.

The driving circuit layer 12 is disposed on a side of the first substrate 11. It should be noted that disposing on one side of the substrate 11 can refer to directly contact to one surface on one side of the substrate 11, or can refer to indirectly contact to the substrate 11.

The driving circuit layer 12 includes a first metal layer 121, a gate insulation layer 122, a semiconductor layer 123, an ohmic contact layer 124, and a second metal layer 125 sequentially stacked on the substrate 11.

The first metal layer 121 can include a plurality of patterned gate electrodes, and a plurality of scan lines extending along a first direction x and spaced apart in a second direction y. The scan lines are configured to transmit scan control signals for turning on and turning off thin film transistors.

A material of the first metal layer 121 can be any one of or an alloy of a plurality of copper, aluminum, silver, molybdenum, titanium, magnesium, etc. The first metal layer 121 can also be a single-layer metal film structure formed by any one of the aforesaid metal materials or alloy materials, or can be a multi-layer metal thin film structure formed by sequentially stacking the aforesaid at least two metal materials or alloy materials.

The gate insulation layer 122 is made of a transparent inorganic material. The transparent inorganic material can be any one or a combination of a plurality of silicon nitride, silicon oxide, or silicon oxynitride.

The semiconductor layer 123 includes a plurality of semiconductor patterns disposed opposite to the gate electrodes. A material of the semiconductor layer 123 is amorphous silicon (A-Si).

The second metal layer 125 includes a plurality of patterned source electrodes and patterned drain electrodes, and a plurality of data lines extending along the second direction y and spaced apart in the first direction x. The data lines are configured to charge pixels by data signals.

A material of the second metal layer 125 can be a metal material of any one of or an alloy of a plurality of copper, aluminum, silver, molybdenum, titanium, magnesium, etc. The second metal layer 125 can also be a single-layer metal film structure formed by any one of the aforesaid metal materials or alloy materials, or can be a multi-layer metal thin film structure formed by sequentially stacking the aforesaid at least two metal materials or alloy materials.

The planarization layer 13 is disposed on a side of the driving circuit layer 12 away from the substrate 11. A side of the planarization layer 13 away from the substrate 11 has an uneven surface which is at least partially uneven. The reflection electrode layer 14 is disposed on the side of the planarization layer 13 away from the substrate 11 and is disposed along the uneven surface of the planarization layer 13 in an uneven shape. By using the uneven shape of the reflection electrode layer 14, a reflective direction of a light in the panel can be changed. Therefore, the light that cannot be reflected at a critical angle of total reflection originally is allowed to reflect out of the panel, thereby increasing the reflectivity of the total reflection liquid crystal display panel.

It should be noted that in a part of regions of the display panel, when light incident from an external ambient light source into the display panel is reflected to the color filter substrate 20 by the reflection electrode layer 14, as an incident angle of the light at the color filter substrate 20 is smaller than a critical angle, the light can be emitted from the color filter substrate 20. A surface on the side of the planarization layer 13 away from the substrate 11 corresponding to this part of the region can be configured to be the flat surface. The reflection electrode layer 14 is disposed along the flat surface of the planarization layer 13 and can also perform in a flat state.

In another part of the regions of the display panel, when the light incident from the external ambient light source into the display panel is reflected to the color filter substrate 20 by the reflection electrode layer 14, as an incident angle of the light at the color filter substrate 20 is greater than or equal to the critical angle, the light is totally reflected at the color filter substrate 20, is reflected to the reflection electrode layer 14, and cannot be emitted from the color filter substrate 20. In this way, after a plurality of reflections between the array substrate 10 and the color filter substrate 20, the light loss is serious, which eventually leads to a low amount of emitted light. A surface on the side of the planarization layer 13 away from the substrate 11 corresponding to this part of the region can be configured to be the uneven surface to make the reflection electrode layer 14 disposed on the uneven surface of the planarization layer 13 be uneven. In this way, the uneven reflection electrode layer 14 can be used to change a reflective direction of the light of this part, so the total reflection of light between the array substrate 10 and the color filter substrate 20 is destroyed, which makes the light that cannot be reflected at a critical angle of total reflection originally be allowed to reflect out of the panel, thereby increasing the reflectivity of the total reflection liquid crystal display panel.

Furthermore, the planarization layer 13 has a plurality of convex structures 131 or concave structures 132, and the plurality of convex structures 131 or the plurality of concave structures 132 are distributed in an array manner on the side of the planarization layer away from the substrate to define the uneven surface.

In one of the embodiments, as illustrated in FIG. 1, the plurality of convex structures 131 are disposed on a surface of the side of the planarization layer 13 away from the substrate 11. The plurality of the convex structures 131 protrude from the flat surface of the planarization layer 13 toward the side away from the substrate 11 to define the uneven surface of the planarization layer 13 away from the substrate 11. The reflection electrode layer 14 is laid on the surface of the side of the planarization layer 13 away from the substrate 11 and demonstrates uneven shapes at where corresponds to the plurality of convex structures 131.

The color filter substrate 20 includes an opposite substrate 21, a color filter layer 22, a protective layer 23, a common electrode 24, and spacers 25 disposed on a side of the opposite substrate 21 near the array substrate 10. The color filter layer 22 includes a red filter layer 221, a green filter layer 222, a blue filter layer 223, and a black matrix 224 distributed in an array manner. The black matrix 224 separates the red filter layer 221, the green filter layer 222, and the blue filter layer 223 from each other to prevent color mixture. The red filter layer 221, the green filter layer 222, and the blue filter layer 223 can transmit light of their corresponding colors.

In one of the embodiments, the convex structures 131 can be respectively disposed corresponding to the red filter layer 221, the green filter layer 222, and the blue filter layer 223 to incident the light of the external environment to pass through the red filter layer 221, the green filter layer 222, and the blue filter layer 223 into the panel. After being reflected by the reflection electrode layer 14, the light is reflected out from inside of the panel through the red filter layer 221, the green filter layer 222, and the blue filter layer 223, so the reflection electrode layer 14 is used to reflect the environmental light to realize color display of the total reflection liquid crystal display panel.

In one of the embodiments, the side of the planarization layer 13 away from the substrate 11 can also be the uneven surface, so that the reflection electrode layer 14 disposed on the planarization layer 13 can also be uneven.

Furthermore, the plurality of convex structures have a curved surface that is convex, and an included angle between a tangent of any point on the curved surface and a flat surface of the planarization layer is less than or equal to 10°.

Figure 2:
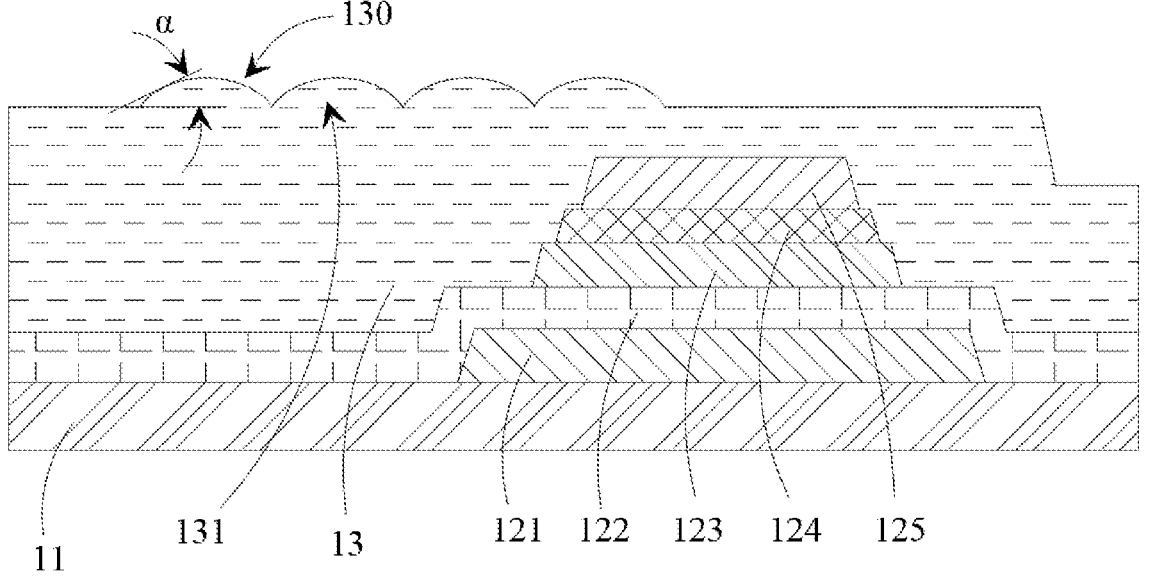
FIG. 2 is a schematic diagram of convex structures provided by one embodiment of the present application.

Illustrated in FIG. 2 is a schematic diagram of convex structures provided by one embodiment of the present application. The convex structures 131 have a curved surface 130 protruding toward the side away from the substrate 11. The included angle α between the tangent of any point on the curved surface 130 and the flat surface of the planarization layer 13 can be 10°, 8°, 6°, 4°, etc.

Preferably, the included angle α between the tangent of any point on the curved surface 130 and the flat surface of the planarization layer 13 ranges from 4° to 10°.

In one of the embodiments, lengths of the plurality of convex structures 131 in the first direction x or the second direction y and heights of the convex structures 131 in a third direction z are all equal. In some other embodiments, the lengths of the plurality of convex structures 131 in the first direction x or the second direction y and the heights of the convex structures 131 can be different, which are not limited herein.

In one embodiment of the present application, the first direction x can be a horizontal direction, the second direction y can be a vertical direction, the third direction z is perpendicular to the first direction x and the second direction y, and the third direction z can be a thickness direction of the total reflection type liquid crystal display panel.

In one of the embodiments, as illustrated in FIG. 1, the plurality of convex structures 131 are distributed continuously on a surface of the side of the planarization layer 13 away from the substrate 11, and a minimum distance between adjacent convex structures 131 is 0.

Figures 3, 4:
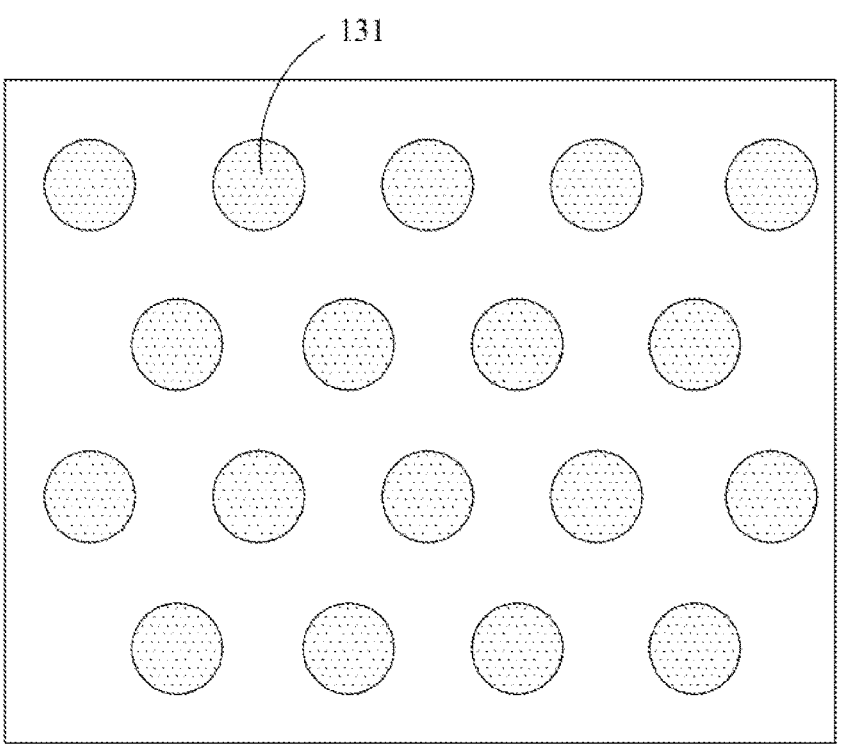
FIG. 3 is a distribution schematic diagram of the convex structures provided by one embodiment of the present application.
FIG. 4 is a distribution schematic diagram of another convex structure provided by one embodiment of the present application.

In one of the embodiments, illustrated in FIG. 3 is a distribution schematic diagram of the convex structures provided by one embodiment of the present application. The plurality of convex structures 131 are distributed spaced apart on a surface of the side of the planarization layer 13 away from the substrate 11, and a distance between adjacent convex structures 131 can be equal or can be different.

Furthermore, a minimum distance d between adjacent convex structures 131 can be greater than 0 and less than or equal to 30 μm. The smaller the distance between adjacent convex structures 131 is, the better the diffuse reflection effect of the reflection electrode layer 14 for light is. For example, the minimum distance d between the adjacent convex structures 131 can be 2 μm, 6 μm, 8 μm, 10 μm, 15 μm, 18 μm, 20 μm, 25 μm, or 30 μm, etc.

In one of the embodiments, as illustrated in FIG. 3, the plurality of convex structures 131 are spaced apart and arranged in rows along the first direction x, and the plurality of convex structures 131 are spaced apart and arranged in columns along the second direction y different from the first direction x.

It should be noted that FIG. 3 only illustrates 4 rows*5 columns of the convex structures 131, which does not represent a size and a number of the convex structures 131 in practical applications.

In one of the embodiments, as illustrated in FIG. 3, any two adjacent rows of the plurality of convex structures 131 are disposed side by side, and any two adjacent columns of the plurality of convex structures 131 are also disposed side by side.

In one of the embodiments, as illustrated in FIG. 4 is a distribution schematic diagram of another convex structure provided by one embodiment of the present application, any two adjacent rows of the plurality of convex structures 131 are disposed in a stagger manner, and any two adjacent columns of the plurality of convex structures 131 are disposed in a stagger manner.

Furthermore, a shape of the plurality of convex structures 131 is any one of a triangle, a quadrilateral, a pentagon, a hexagon, a circle, or an ellipse.

In one of the embodiments, as illustrated in FIG. 3, a planar shape of the convex structures 131 is circular, and the plane can be parallel to the first direction x and the second direction y.

Figure 5:
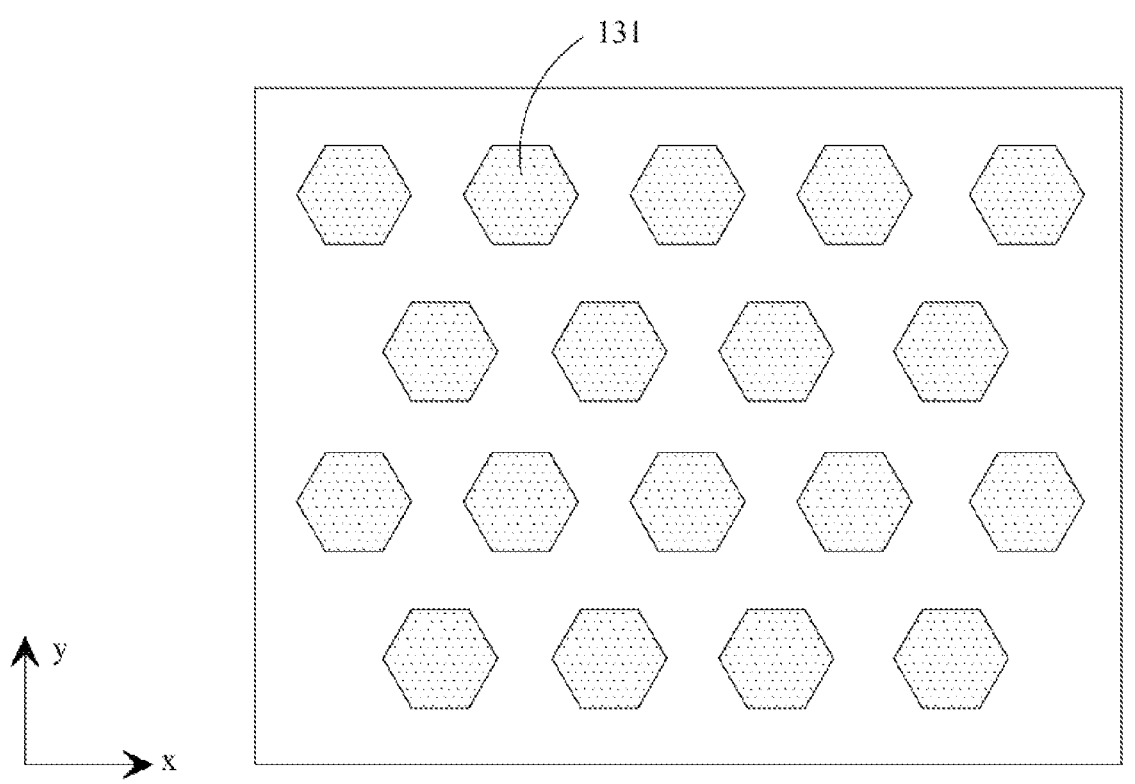
FIG. 5 is a schematic diagram of another convex structure provided by one embodiment of the present application.

In one of the embodiments, illustrated in FIG. 5 is a schematic diagram of another convex structure provided by one embodiment of the present application, and the convex structures 131 can also be hexagonal.

In some other embodiments, the convex structures 131 can also be any one of a triangle, a quadrangle, a pentagon, a hexagon, or other polygons, or an ellipse, etc.

Figure 6:
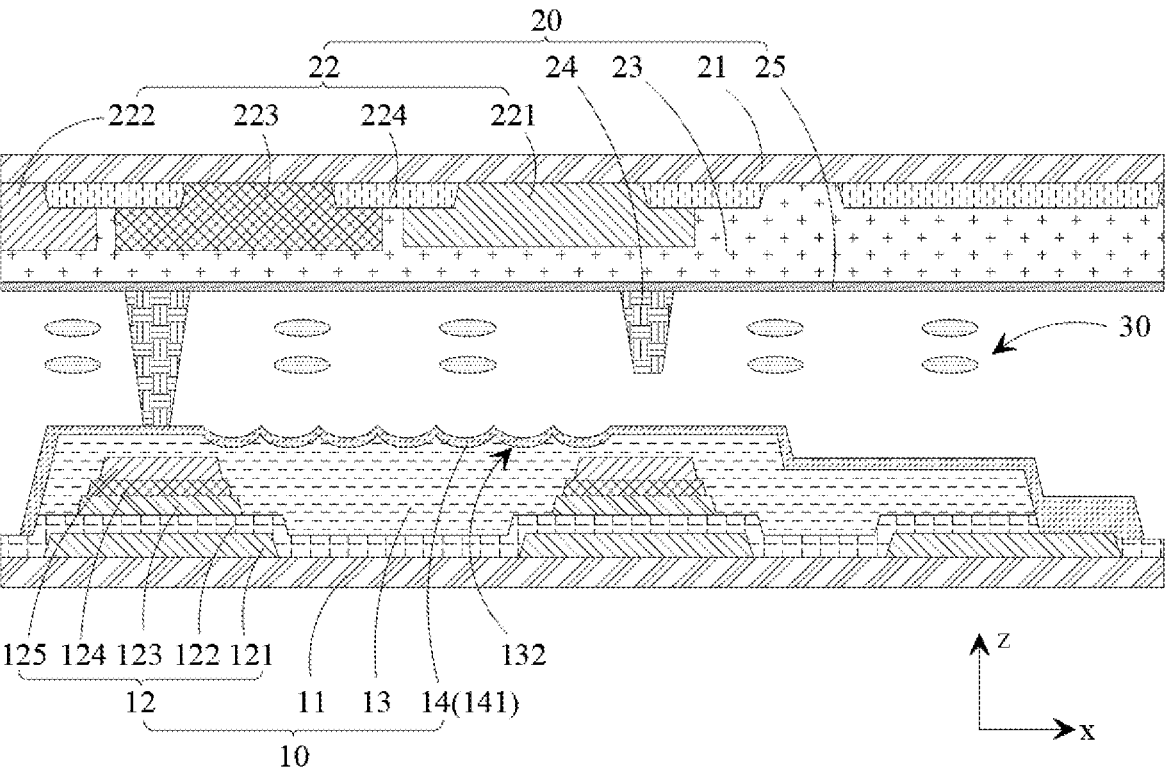
FIG. 6 is a structural schematic diagram of another total reflection liquid crystal display panel provided by one embodiment of the present application.

In one of the embodiments, illustrated in FIG. 6 is a structural schematic diagram of another total reflection liquid crystal display panel provided by one embodiment of the present application, the structure is substantially same as the structure illustrated in FIG. 1, the difference is that:

a plurality of concave structures 132 are disposed on a surface of the side of the planarization layer 13 away from the substrate 11, the plurality of the concave structures 132 are recessed away from the substrate 11 to define the uneven surface of the planarization layer 13 away from the substrate 11, the reflection electrode layer 14 is laid on the surface of the side of the planarization layer 13 away from the substrate 11, and demonstrates uneven shapes at where corresponds to the plurality of concave structures 132.

In one of the embodiments, the concave structures 132 can be respectively disposed corresponding to the red filter layer 221, the green filter layer 222, and the blue filter layer 223 to incident the light of the external environment to pass through the red filter layer 221, the green filter layer 222, and the blue filter layer 223 into the panel. After being reflected by the reflection electrode layer 14, the light is reflected out from inside of the panel through the red filter layer 221, the green filter layer 222, and the blue filter layer 223, so the reflection electrode layer 14 is configured to reflect the environmental light to realize color display of the total reflection liquid crystal display panel.

In one of the embodiments, the side of the planarization layer 13 away from the substrate 11 can also be the uneven surface, so that the reflection electrode layer 14 disposed on the planarization layer 13 can also be uneven.

Furthermore, the plurality of concave structures have a curved surface that is concave, and an included angle between a tangent of any point on the curved surface and a flat surface of the planarization layer is less than or equal to 10°.

Figure 7:
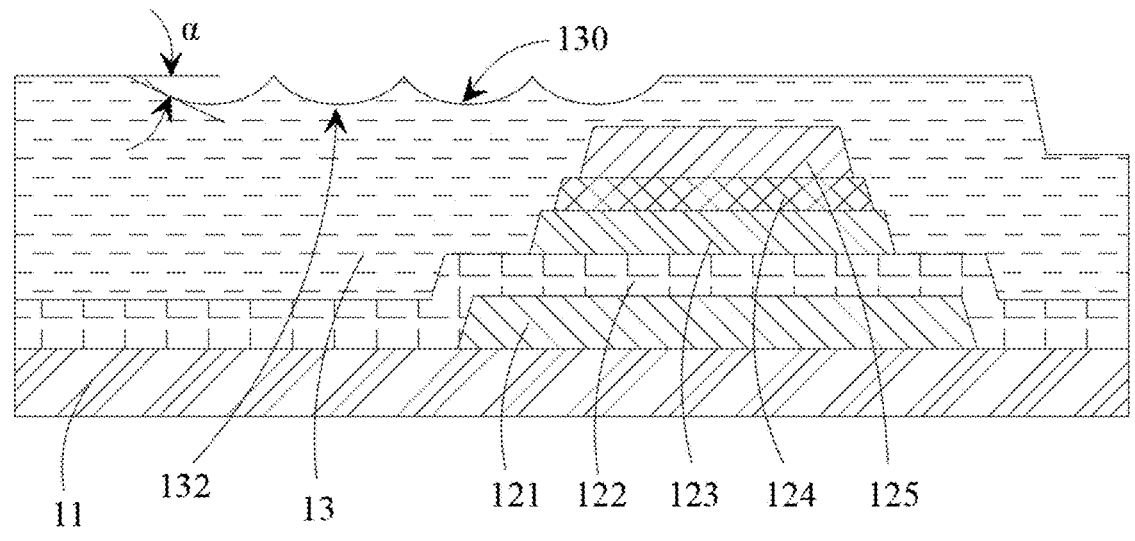
FIG. 7 is a schematic diagram of concave structures provided by one embodiment of the present application.

Illustrated in FIG. 7 is a schematic diagram of concave structures provided by one embodiment of the present application. The concave structures 132 have a curved surface 130 recessed toward the substrate 11, and the included angle α between the tangent of any point on the curved surface 130 and the flat surface of the planarization layer 13 can be 10°, 8°, 6°, 4°, etc.

Preferably, the included angle α between the tangent of any point on the curved surface 130 and the flat surface of the planarization layer 13 ranges from 4° to 10°.

In one of the embodiments, lengths of the plurality of concave structures 132 in the first direction x or the second direction y and heights of the concave structures 132 in a third direction z are all equal. In some other embodiments, the lengths of the plurality of concave structures 132 in the first direction x or the second direction y and the heights of the concave structures 132 can be different, which are not limited herein.

In one of the embodiments, as illustrated in FIG. 6, the plurality of concave structures 132 are distributed continuously on a surface of the side of the planarization layer 13 away from the substrate 11, and a minimum distance between adjacent concave structures 132 is 0.

In one of the embodiments, the plurality of concave structures 132 are distributed spaced apart on a surface of the side of the planarization layer 13 away from the substrate 11, and a distance between adjacent concave structures 132 can be equal or can be different.

Furthermore, a minimum distance d between the adjacent concave structures 132 can be greater than 0 and less than or equal to 30 μm. The smaller the distance between the adjacent concave structures 132 is, the better the diffuse reflection effect of the reflection electrode layer 14 for light is. For example, the minimum distance d between the adjacent concave structures 132 can be 2 μm, 6 μm, 8 μm, 10 μm, 15 μm, 18 μm, 20 μm, 25 μm, or 30 μm, etc.

In one of the embodiments, the plurality of concave structures 132 are spaced apart and arranged in rows along the first direction x, and the plurality of concave structures 132 are spaced apart and arranged in columns along the second direction y different from the first direction x.

In one of the embodiments, any two adjacent rows of the plurality of concave structures 132 are disposed side by side, and any two adjacent columns of the plurality of concave structures 132 are also disposed side by side.

In one of the embodiments, any two adjacent rows of the plurality of concave structures 132 are disposed in a stagger manner, and any two adjacent columns of the plurality of concave structures 132 are disposed in a stagger manner.

Furthermore, a shape of the plurality of concave structures 132 is any one of a triangle, a quadrilateral, a pentagon, a hexagon, a circle, or an ellipse.

In one of the embodiments, a planar shape of the concave structures 132 is circular, and the plane can be parallel to the first direction x and the second direction y.

In one of the embodiments, the concave structures 132 can also be hexagonal.

In some other embodiments, the concave structures 132 can also be any one of a triangle, a quadrangle, a pentagon, a hexagon, or other polygons, or an ellipse, etc.

In one embodiment of the present application, a material of the planarization layer 13 can be a copolymer of a small amount of perfluoropropyl perfluorovinyl ether and perfluoroalkoxy (PFA) or an organic material generally used in the planarization (PLN) layer in current display panels.

In an actual manufacturing process, the planarization layer 13 can be formed by coating or deposition first, and then the side of the planarization layer 13 away from the substrate 11 can be etched to form the uneven surface having the convex structures 131 or the concave structures 132 at a part thereof. Then, the reflection electrode layer 14 is formed on the side surface of the planarization layer 13 away from the substrate 11. The reflection electrode layer 14 can be disposed in the uneven shape at where corresponds to the uneven surface.

Furthermore, the reflection electrode layer 14 includes a first electrode layer 141, a material of the first electrode layer 141 is a metal or an alloy.

In one of the embodiments, as illustrated in FIG. 1, the reflection electrode layer 14 only includes the first electrode layer 141 made of a metal or an alloy material. The material of the first electrode layer 141 can be a metal that is not easily oxidized such as gold, or other alloy materials such as stainless steel, etc. In this way, there is no need to dispose protective electrodes on an upper side and a lower side of the first electrode layer 141, which can simplify the structure of the reflection electrode layer 14 and can reduce the manufacturing difficulty and a thickness of the total reflection liquid crystal display panel.

In one of the embodiments, the reflection electrode layer 14 includes the first electrode layer 141, a second electrode layer 142, and a third electrode layer 143, and the first electrode layer 141 is disposed between the second electrode layer 142 and the third electrode layer 143.

Figure 8:
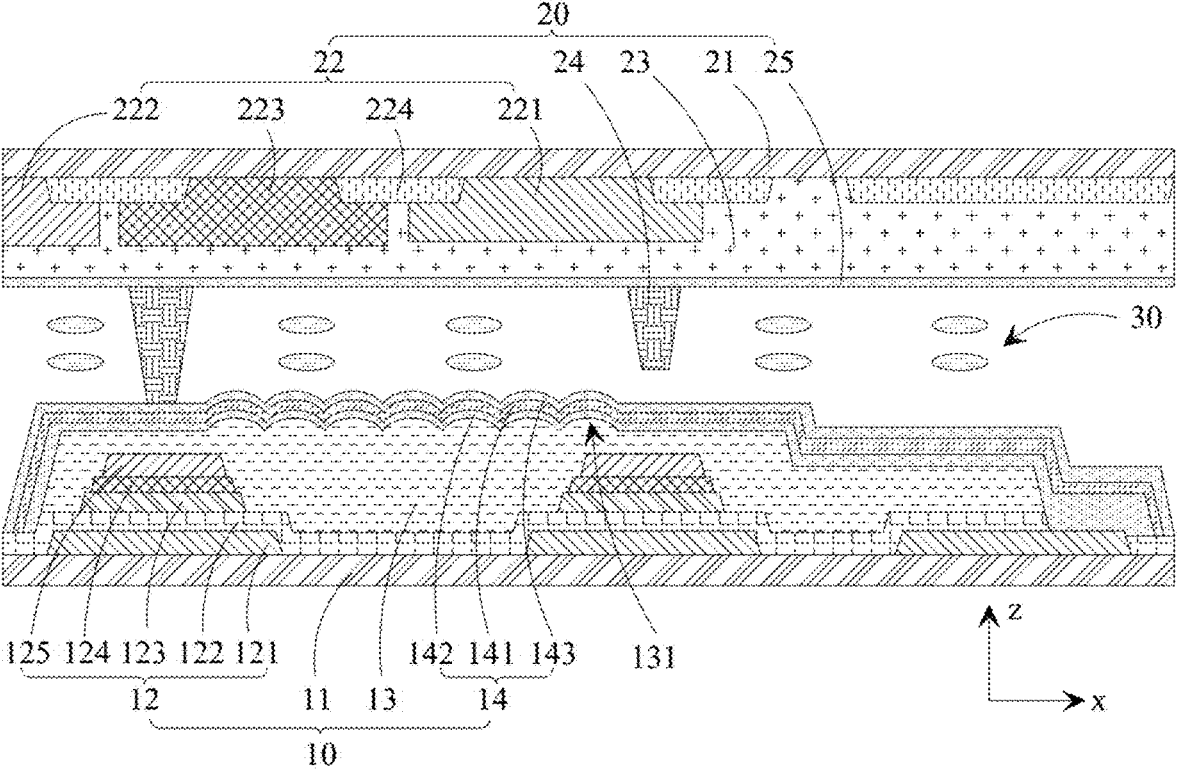
FIG. 8 is a structural schematic diagram of another total reflection liquid crystal display panel provided by one embodiment of the present application.

Illustrated in FIG. 8 is a structural schematic diagram of another total reflection liquid crystal display panel provided by one embodiment of the present application. The structure is substantially same as the structure illustrated in FIG. 1, the difference is that:

the reflection electrode layer 14 includes the first electrode layer 141, the second electrode layer 142, and the third electrode layer 143; the second electrode layer 142 is disposed on a surface of the side of the planarization layer 13 away from the substrate 11; the first electrode layer 141 is disposed on a surface of the second electrode layer 142 away from the substrate 11; the third electrode 143 is disposed on a surface of a side of the first electrode layer 141 away from the second electrode layer 142; and the first electrode layer 141, the second electrode layer 142, and the third electrode layer 143 are all configured in an uneven shape corresponding to the convex structures 131.

A material of the first electrode layer 141 can be a material of a metal or an alloy. Specifically, the material of the first electrode layer 141 can be a metal of any one of copper, aluminum, or silver, or an alloy containing the aforesaid metal.

A material of the second electrode layer 142 and the third electrode layer 143 is a transparent conductive metal oxide. By disposing the second electrode layer 142 and the third electrode layer 143 respectively on the upper and lower sides of the first electrode layer 141, protection for the first electrode layer 141 is formed, and oxidization and corrosion of the first electrode layer 141 are prevented.

Specifically, the transparent conductive metal oxide can be indium tin oxide (ITO).

Figure 9:
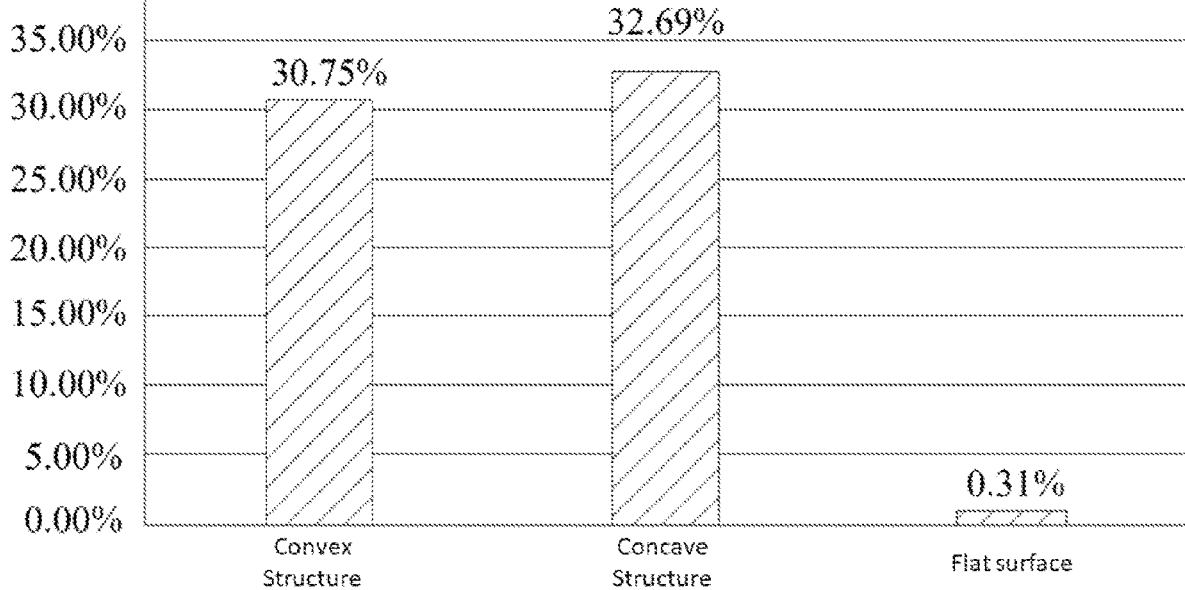
FIG. 9 is a bar graph of an actually measured diffuse reflection result of the convex structures and the concave structures produced during a verification process of one embodiment of the present application.

Illustrated in FIG. 9 is a bar graph of an actually measured diffuse reflection result of the convex structures and the concave structures produced during a verification process of one embodiment of the present application. In a situation that the convex structures 131 are disposed on the surface of the side of the planarization layer 13 away from the substrate 11, the specular component exclude (SCE) is 30.75%. In a situation that the concave structures 132 are disposed on the surface of the side of the planarization layer 13 away from the substrate 11, the SCE is 32.69%. In a situation that the surface of the side of the planarization layer 13 away from the substrate 11 is a flat surface, the SCE is 0.31%. It can be understood that, by disposing the convex structures 131 or the concave structures 132 on the surface of the side of the planarization layer 13 away from the substrate 11, the reflection electrode 14 can be configured to be in the uneven shape, which can change the reflective direction of the light in the panel, and can allow the light that cannot be reflected at a critical angle of total reflection originally is allowed to be reflected out of the panel, thereby increasing the reflectivity of the total reflection liquid crystal display panel.

According to the display panel provided by the aforesaid embodiments of the present application, one embodiment of the present application further provides an electronic device. The electronic device includes the display panel of provided by the aforesaid embodiments. The electronic device can be a mobile terminal, e.g., a color electronic paper, a color e-book, a smart phone, etc., the electronic device can also be a wearable terminal, e.g., a smart watch, a smart bracelet, etc., and the electronic device can also be a fixed terminal, e.g., a color electronic billboard, a color electronic poster, etc.

Beneficial effects of the embodiments of the present application: the embodiments of the present application provide the total reflection liquid crystal display panel; the total reflection liquid crystal display panel includes the array substrate, the color filter substrate, and the liquid crystal layer; the array substrate includes the substrate, the driving circuit layer, the planarization layer, and the reflection electrode layer; by disposing the at least partially uneven surface on the side of the planarization layer away from the substrate, the reflection electrode can be disposed along the uneven surface of the planarization layer in the uneven shape, thereby changing an reflective direction of a light in the panel; therefore, the light that cannot be reflected at a critical angle of total reflection originally is allowed to be reflected out of the panel, thereby increasing the reflectivity of the total reflection liquid crystal display panel.

In summary, although the present application has disclosed the preferred embodiments as above, however the above-mentioned preferred embodiments are not to limit to the present application. A person skilled in the art can make any change and modification, therefore the scope of protection of the present application is subject to the scope defined by the claims.

What is claimed is:

1. An array substrate, comprising:
a substrate;
a driving circuit layer disposed on the substrate;
a planarization layer disposed on a side of the driving circuit layer away from the substrate, wherein a side of the planarization layer away from the substrate has an uneven surface which is at least partially uneven; and
a reflection electrode layer disposed on the side of the planarization layer away from the substrate and disposed along the uneven surface of the planarization layer in an uneven shape, wherein the uneven surface is configured to reflect light from the reflection electrode layer,
wherein the planarization layer has a plurality of convex structures or concave structures, a minimum distance between adjacent concave structures or between adjacent convex structures is greater than 0 and less than or equal to 30 μm, the driving circuit layer includes a first metal layer, a gate insulation layer, a semiconductor layer, an ohmic contact layer, and a second metal layer sequentially stacked on the substrate, the first metal layer includes a scanning line-related pattern, and the second metal layer includes a data line-related pattern,
wherein the first metal layer includes a plurality of patterned gate electrodes, the semiconductor layer includes a plurality of semiconductor patterns disposed opposite to the gate electrodes,
wherein distances between adjacent convex structures or between adjacent concave structures comprise a plurality of values that are different from one another,
wherein the reflection electrode layer comprises a first electrode layer, a second electrode layer and a third electrode layer, the first electrode layer is disposed between the second electrode layer and the third electrode layer, a material of the first electrode layer comprises an alloy of any one or more selected from gold, silver, copper, and aluminum, and materials of the second electrode layer and the third electrode layer are transparent conductive metal oxides,
wherein first portions of the first electrode layer, the second electrode layer and the third electrode layer cover a surface of the planarization layer away from the substrate, second portions of the first electrode layer, the second electrode layer and the third electrode layer cover a surface of the first metal layer away from the substrate, and third portions of the first electrode layer, the second electrode layer and the third electrode layer cover a surface of the gate insulation layer away from the substrate, and
wherein the first portion of the second electrode layer is in contact with the surface of the planarization layer away from the substrate, the second portion of the second electrode layer is in contact with the surface of the first metal layer away from the substrate, and the third portion of the second electrode layer is in contact with the surface of the gate insulation layer away from the substrate.

2. The array substrate as claimed in claim 1, wherein the plurality of convex structures or the plurality of concave structures are distributed in an array manner on the side of the planarization layer away from the substrate.

3. The array substrate as claimed in claim 2, wherein under a condition that the planarization layer has a plurality of convex structures, the plurality of convex structures have a curved surface that is convex, and an included angle between a tangent of any point on the curved surface and a flat surface of the planarization layer is less than or equal to 10°.

4. The array substrate as claimed in claim 2, wherein under a condition that the planarization layer has a plurality of concave structures, the plurality of concave structures have a curved surface that is concave, and an included angle between a tangent of any point on the curved surface and a flat surface of the planarization layer is less than or equal to 10°.

5. The array substrate as claimed in claim 2, wherein the plurality of convex structures or the plurality of concave structures are distributed continuously or spaced apart on the surface of the planarization layer away from the substrate.

6. The array substrate as claimed in claim 5, wherein under a condition that the planarization layer has a plurality of convex structures, the plurality of convex structures are spaced apart and arranged in rows along a first direction, the plurality of convex structures are spaced apart and arranged in columns along a second direction, and the first direction is different from the second direction; and wherein any two adjacent rows or any two adjacent columns of the plurality of convex structures are disposed side by side, or any two adjacent rows or any two adjacent columns of the plurality of convex structures are disposed in a stagger manner.

7. The array substrate as claimed in claim 5, wherein under a condition that the planarization layer has a plurality of concave structures, the plurality of concave structures are spaced apart and arranged in rows along a first direction, the plurality of concave structures are spaced apart and arranged in columns along a second direction, and the first direction is different from the second direction; and wherein any two adjacent rows or any two adjacent columns of the plurality of concave structures are disposed side by side, or any two adjacent rows or any two adjacent columns of the plurality of concave structures are disposed in a stagger manner.

8. The array substrate as claimed in claim 2, wherein a shape of the plurality of convex structures or the plurality of concave structures is any one of a triangle, a quadrilateral, a pentagon, a hexagon, a circle, or an ellipse.

9. A total reflection liquid crystal display panel, comprising an array substrate, a color filter substrate, and a liquid crystal layer disposed between the array substrate and the color filter substrate, wherein the color filter substrate includes an opposite substrate, and includes a color filter layer, a protective layer, a common electrode, and spacers disposed on a side of the opposite substrate near the array substrate, and wherein the array substrate comprises:

a substrate;

a driving circuit layer disposed on the substrate;

a planarization layer disposed on a side of the driving circuit layer away from the substrate, wherein a side of the planarization layer away from the substrate has an uneven surface which is at least partially uneven; and a reflection electrode layer disposed on the side of the planarization layer away from the substrate and disposed along the uneven surface of the planarization layer in an uneven shape, wherein the uneven surface is configured to reflect light out of the total reflection liquid crystal display panel, wherein the planarization layer has a plurality of convex structures or concave structures, a minimum distance between adjacent concave structures or between adjacent convex structures is greater than 0 and less than or equal to 30 μm, the driving circuit layer includes a first metal layer, a gate insulation layer, a semiconductor layer, an ohmic contact layer, and a second metal layer sequentially stacked on the substrate, the first metal layer includes a scanning line-related pattern, and the second metal layer includes a data line-related pattern, wherein the first metal layer includes a plurality of patterned gate electrodes, the semiconductor layer includes a plurality of semiconductor patterns disposed opposite to the gate electrodes, wherein distances between adjacent convex structures or between adjacent concave structures comprise a plurality of values that are different from one another, wherein the reflection electrode layer comprises a first electrode layer, a second electrode layer and a third electrode layer, the first electrode layer is disposed between the second electrode layer and the third electrode layer, a material of the first electrode layer comprises an alloy of any one or more selected from gold, silver, copper, and aluminum, and materials of the second electrode layer and the third electrode layer are transparent conductive metal oxides, wherein first portions of the first electrode layer, the second electrode layer and the third electrode layer cover a surface of the planarization layer away from the substrate, second portions of the first electrode layer, the second electrode layer and the third electrode layer cover a surface of the first metal layer away from the substrate, and third portions of the first electrode layer, the second electrode layer and the third electrode layer cover a surface of the gate insulation layer away from the substrate, and wherein the first portion of the second electrode layer is in contact with the surface of the planarization layer away from the substrate, the second portion of the second electrode layer is in contact with the surface of the first metal layer away from the substrate, and the third portion of the second electrode layer is in contact with the surface of the gate insulation layer away from the substrate.

10. The total reflection liquid crystal display panel as claimed in claim 9, wherein the plurality of convex structures or the plurality of concave structures are distributed in an array manner on the side of the planarization layer away from the substrate.

11. The total reflection liquid crystal display panel as claimed in claim 10, wherein under a condition that the planarization layer has a plurality of convex structures, the plurality of convex structures have a curved surface that is convex, and an included angle between a tangent of any point on the curved surface and a flat surface of the planarization layer is less than or equal to 10°.

12. The total reflection liquid crystal display panel as claimed in claim 10, wherein under a condition that the planarization layer has a plurality of concave structures, the plurality of concave structures have a curved surface that is concave, and an included angle between a tangent of any point on the curved surface and a flat surface of the planarization layer is less than or equal to 10°.

13. The total reflection liquid crystal display panel as claimed in claim 10, wherein the plurality of convex structures or the plurality of concave structures are distributed continuously or spaced apart on the surface of the planarization layer away from the substrate.

14. The total reflection liquid crystal display panel as claimed in claim 13, wherein under a condition that the planarization layer has a plurality of convex structures, the plurality of convex structures are spaced apart and arranged in rows along a first direction, the plurality of convex structures are spaced apart and arranged in columns along a second direction, and the first direction is different from the second direction; and wherein any two adjacent rows or any two adjacent columns of the plurality of convex structures are disposed side by side, or any two adjacent rows or any two adjacent columns of the plurality of convex structures are disposed in a stagger manner.

15. A total reflection liquid crystal display panel, comprising an array substrate, a color filter substrate, and a liquid crystal layer disposed between the array substrate and the color filter substrate, wherein the color filter substrate includes an opposite substrate, and includes a color filter layer, a protective layer, a common electrode, and spacers disposed on a side of the opposite substrate near the array substrate, and wherein the array substrate comprises:

a substrate;

a driving circuit layer disposed on the substrate;

a planarization layer disposed on a side of the driving circuit layer away from the substrate, wherein a side of the planarization layer away from the substrate has an uneven surface which is at least partially uneven; and a reflection electrode layer disposed on the side of the planarization layer away from the substrate and disposed along the uneven surface of the planarization layer in an uneven shape, wherein the uneven surface is configured to reflect light from the reflection electrode layer, wherein the planarization layer has a plurality of convex structures or concave structures, a minimum distance between adjacent concave structures or between adjacent convex structures is greater than 0 and less than or equal to 30 μm, the driving circuit layer includes a first metal layer, a gate insulation layer, a semiconductor layer, an ohmic contact layer, and a second metal layer sequentially stacked on the substrate, the first metal layer includes a scanning line-related pattern, and the second metal layer includes a data line-related pattern, wherein the first metal layer includes a plurality of patterned gate electrodes, the semiconductor layer includes a plurality of semiconductor patterns disposed opposite to the gate electrodes, wherein distances between adjacent convex structures or between adjacent concave structures comprise a plurality of values that are different from one another, wherein the reflection electrode layer comprises a first electrode layer, a second electrode layer and a third electrode layer, the first electrode layer is disposed between the second electrode layer and the third electrode layer, a material of the first electrode layer comprises an alloy of any one or more selected from gold, silver, copper, and aluminum, and materials of the second electrode layer and the third electrode layer are transparent conductive metal oxides, wherein first portions of the first electrode layer, the second electrode layer and the third electrode layer cover a surface of the planarization layer away from the substrate, second portions of the first electrode layer, the second electrode layer and the third electrode layer cover a surface of the first metal layer away from the substrate, and third portions of the first electrode layer, the second electrode layer and the third electrode layer cover a surface of the gate insulation layer away from the substrate, wherein the first portion of the second electrode layer is in contact with the surface of the planarization layer away from the substrate, the second portion of the second electrode layer is in contact with the surface of the first metal layer away from the substrate, and the third portion of the second electrode layer is in contact with the surface of the gate insulation layer away from the substrate, wherein a shape of the plurality of convex structures or the plurality of concave structures is a hexagon, wherein under a condition that the planarization layer has the plurality of concave structures, the plurality of concave structures are spaced apart and arranged in rows along a first direction, the plurality of concave structures are spaced apart and arranged in columns along a second direction, and the first direction is different from the second direction, and wherein any two adjacent rows or any two adjacent columns of the plurality of concave structures are disposed in a stagger manner.

\* \* \* \* \*